(12) United States Patent
Nojima et al.

(10) Patent No.: US 7,377,656 B2
(45) Date of Patent: May 27, 2008

(54) PROJECTOR

(75) Inventors: Shigeo Nojima, Suwa (JP); Masatoshi Yonekubo, Hara-mura (JP); Takashi Takeda, Suwa (JP); Tetsuro Yamazaki, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 270 days.

(21) Appl. No.: 11/194,627

(22) Filed: Aug. 2, 2005

(65) Prior Publication Data
US 2006/0028622 A1    Feb. 9, 2006

(30) Foreign Application Priority Data

Aug. 4, 2004  (JP) ............................ 2004-227759
May 27, 2005 (JP) ............................ 2005-155961

(51) Int. Cl.
*G03B 21/22* (2006.01)
*G03B 21/20* (2006.01)
*G03B 21/56* (2006.01)
*G03H 1/02* (2006.01)
*H01S 3/10* (2006.01)

(52) U.S. Cl. ......................... 353/77; 353/79; 353/102; 359/27; 359/449; 359/460; 372/23; 372/24

(58) Field of Classification Search ................. 353/75, 353/77, 78, 79, 119, 122, 102; 348/67, 739, 348/744, 745, 787, 789, 836; 349/5, 7, 8, 349/22; 359/17, 27, 331, 453, 456, 460, 359/449; 372/23, 24
See application file for complete search history.

(56) References Cited
FOREIGN PATENT DOCUMENTS
JP    2002-006397 A    1/2002

*Primary Examiner*—Rochelle-Ann Blackman
(74) *Attorney, Agent, or Firm*—Oliff & Berridge, PLC

(57) ABSTRACT

A projector of rear-projection type including a light source that outputs a laser beam and a scanner that scans a screen with the laser beam. When a laser beam with energy exceeds an accessible emission limit due to failure of the light source or the scanner, at least one optical member located in an optical path of the laser beam is arranged so as to be broken or altered in quality and to prevent or discourage the beam with energy exceeding the accessible emission limit from being output from the screen.

18 Claims, 8 Drawing Sheets

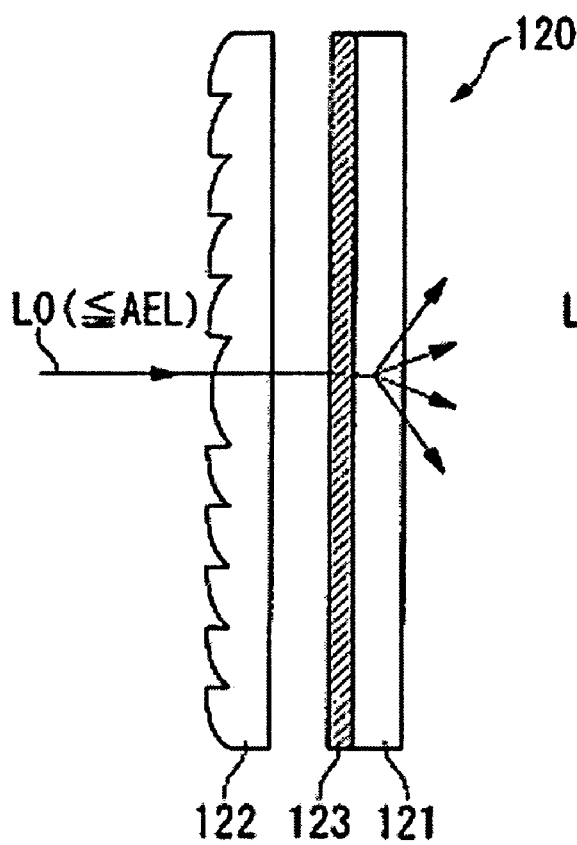
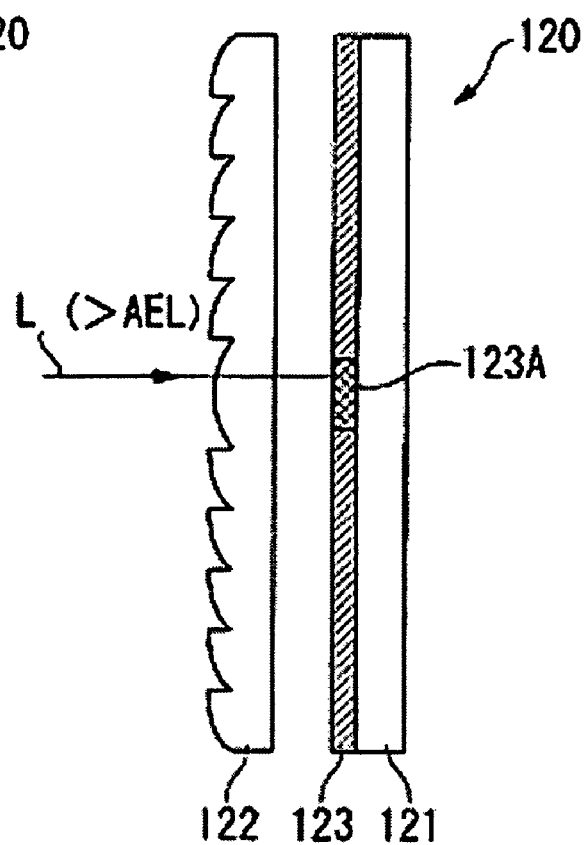

PROJECTOR

This nonprovisional application claims the benefit of Japanese Patent Applications No. 2004-227759, filed Aug. 4, 2004 and No. 2005-155961, filed May 27, 2005. The entire disclosure of the prior applications is hereby incorporated by reference herein in its entirety.

BACKGROUND

The exemplary embodiments relate to a rear-projection type projector to display an image by scanning a screen with a laser beam.

In the related art, a rear-projection type projector to display an image by scanning a screen with a laser beam has been described. Since this related art projector can display perfect black by stopping the supply of the laser beam, it can perform display with higher contrast compared to a projector using liquid crystal light valves, for example. Further, since the laser beam has high directivity, the projection system can be simplified. Accordingly, the projector can be made compact and simple. Further, colorization may be easy by combining a plurality of laser beams of red, green, blue, etc. Additionally, color display with high color purity can be performed because of high monochromaticity of the laser beams.

However, in the case where a laser beam is used to display an image, sufficient consideration must be paid for safety so that the laser beam may not accidentally directly enter an eye of an observer. A related technology for a safety mechanism of a projector, is described in Japanese Patent Application Publication 2002-6397 (JP 2002-6397).

The technology described in the publication JP 2002-6397 includes blocking a laser output when a sensor detects the presence of an object near a projection lens. However, it is conceivable that a laser beam with high intensity may be output to the observer due to failure of the sensor because of an unexpected external cause, or failure of output control circuit of the laser beam, or the like.

SUMMARY

The exemplary embodiments are directed to providing a safer projector.

A projector according to the exemplary embodiments is a projector of rear-projection type including: a light source that outputs a laser beam, the laser beam having an optical path, and a scanner that scans a screen with the laser beam, at least one optical member located in the optical path of the laser beam being arranged to be broken or altered in quality when the laser beam has an energy exceeding an accessible emission limit due to failure of the light source or the scanner and to prevent the laser beam having the energy exceeding the accessible emission limit from being output from the screen. The first accessible emission limit being the maximum exposure level permitted when an operation of the scanner is normal and output intensity of the light source is abnormal, and the second accessible emission limit being the maximum exposure level permitted when the output intensity of the light source is normal and the scanner stops due to failure. An optical member located before the scanner in the optical path of the laser beam may be arranged so as to be broken or altered in quality by a laser output exceeding a first accessible emission limit and an optical member located behind the scanner in the optical path of the laser beam may be arranged so as to be broken or altered in quality by a laser output exceeding a second accessible emission limit, the first accessible emission limit being the maximum exposure level permitted when an operation of the scanner is normal and output intensity of the light source is abnormal, and the second accessible emission limit being the maximum exposure level permitted when the output intensity of the light source is normal and the scanner stops due to failure.

According to the configuration, since the laser beam is blocked by directly breaking the optical member or the like by way of no related art complex control, the safety of display can be ensured independent of errors due to malfunction of the sensor, or the like.

The scanner may have a movable plate rotatable around a predetermined rotation axis, a solid layer that melts by heat of the laser beam exceeding the first accessible emission limit, and a light reflection film formed on a surface of the movable plate via the solid layer. According to the configuration, even when a laser beam with high intensity enters the scanner, the solid layer melts and the light reflection film deforms to diffuse the entering high intensity laser beam so that the high intensity laser beam is not observed by an observer.

In the configuration, it is desirable that the movable plate is formed by a material having an absorption wavelength region in a wavelength region of the laser beam. According to the configuration, even when the solid layer melts and the light reflection film peels off, the laser beam is absorbed by the light-absorbing movable plate exposed by the peeling so that the high intensity laser beam is not observed by an observer.

The screen may have a coloring layer that colors by heat of the laser beam exceeding the second accessible emission limit. According to the configuration, even when the high intensity laser beam enters the screen, the coloring layer absorbs an entire or a part of the laser beam so that the high intensity laser beam is not observed by an observer.

A projection lens may be provided between the scanner and the screen. The projection lens may have a coloring layer that colors by heat of the laser beam exceeding the second accessible emission limit. According to the configuration, even when the high intensity laser beam enters the projection lens, the coloring layer absorbs entire or part of the laser beam so that the high intensity laser beam is not observed by an observer.

A projection lens may be provided between the scanner and the screen, and the projection lens may be formed by a material (such as so-adjusted acryl or the like) that phase-transitions by heat of the laser beam exceeding the second accessible emission limit. According to the configuration, even when the high intensity laser beam enters the projection lens, the laser beam is diffused by the deformation of the lens or air-bubbles produced within the lens, or the like, so that the high intensity laser beam is not observed by an observer.

A collimator or beam shaping lens may be provided between the scanner and the light source. The lens may have a coloring layer that colors by heat of the laser beam exceeding the first accessible emission limit. According to the configuration, even when the high intensity laser beam enters the lens, the coloring layer absorbs entire or part of the laser beam so that the high intensity laser beam is not observed by an observer.

A collimator or beam shaping lens may be provided between the scanner and the light source. The lens may be formed by a material that phase-transitions (such as so-adjusted acryl or the like) by heat of the laser beam exceeding the first accessible emission limit. According to the configuration, even when the high intensity laser beam enters the projection lens, the laser beam is diffused by the deformation of the lens or air-bubbles produced within the lens, or the like so that the high intensity laser beam is not observed by an observer.

A reflection mirror may be provided between the scanner and the screen. The reflection mirror may have a base material, a solid layer that melts by heat of the laser beam exceeding the second accessible emission limit, and a light reflection film formed on the surface of the base material via the solid layer. According to the configuration, even when the high intensity laser beam enters the reflection mirror, the solid layer melts and the light reflection film deforms to diffuse the entering high intensity laser beam so that the high intensity laser beam is not observed by an observer.

In the configuration, it is desirable that the base material is formed by a material having an absorption wavelength region in a wavelength region of the laser beam. According to the configuration, even when the solid layer melts and the light reflection film peels off, the laser beam is absorbed by the light-absorbing base material exposed by the peeling, the high intensity laser beam is not observed by an observer.

An enlargement system may be provided between the screen and the scanner. An optical member located before the enlargement system in the optical path of the laser beam may be arranged so as to be broken or altered in quality when a beam with energy exceeding the accessible emission limit is output.

Since the optical member with such a safety mechanism has a special structure to be broken or altered in quality, higher cost is required compared to a general one, however, in the case where the structure is applied to the optical member located before the enlargement system, the size of the optical member can be made smaller by adjusting the magnifying power and such a cost rise can be reduced or minimized.

A light collection system may be provided between the optical member and the enlargement system.

According to the configuration, since the light is colleted by the light collection system, the size of the optical member having such a special structure can be made smaller.

BRIEF DESCRIPTION OF THE DRAWINGS

The exemplary embodiments will be described with reference to the accompanying drawings, wherein:

FIGS. 2A and 2B are sectional views showing a configuration of a screen according to the first exemplary embodiment;

DETAILED DESCRIPTION OF EMBODIMENTS

Figure 1:
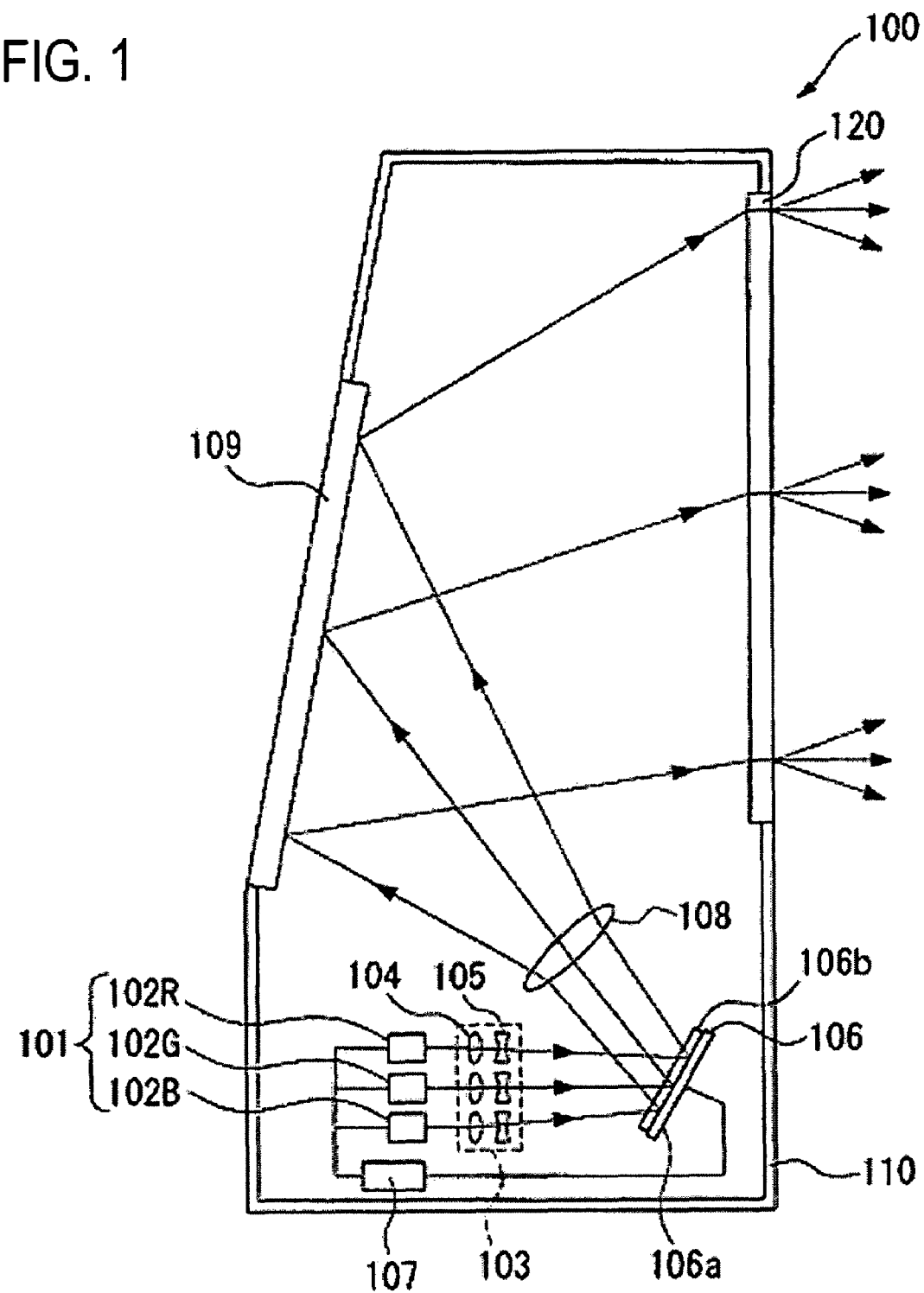
FIG. 1 is a schematic diagram of a configuration of a projector according to a first exemplary embodiment of the invention.

Hereinafter, exemplary embodiments of the invention will be described by referring to the drawings. In the drawings described below, film thicknesses, dimensional proportions, etc. of respective component elements will be described in order to facilitate visualization and are not intended to limit the scope of the exemplary embodiments.

First Exemplary Embodiments

FIG. 1 is a schematic diagram of a configuration of a projector according to a first exemplary embodiment of the invention. A projector 100 of the first exemplary embodiment has a light source 101 to output a laser beam, a lens system 103 including a collimator system 104 and a beam shaping system 105, a scanner 106 to scan with the incident laser beam in a two-dimensional direction, a projection lens 108 to enlarge and project the scanning beam, and a reflection mirror 109 to reflect the projected beam toward a screen 120. In this projector 100, the light source 101, the lens system 103, the scanner 106, the projection lens 108, and the reflection mirror 109 are accommodated within a casing 110 with the screen 120, and an image is displayed by scanning the screen 120 with the laser beam that has been propagated within the casing 110.

As described below, the configuration of the projector of the first exemplary embodiment will be described with the actions thereof.

The light source 101 includes three kinds of laser diodes, a red laser diode 102R to output a red laser beam, a green laser diode 102G to output a green laser beam, and a blue laser diode 102B to output a blue laser beam. These laser diodes 102R, 102G, and 102B output laser beams with intensity modulated in response to image signals from a control unit 107. The laser beams output from the light source 101 enter the lens system 103, including the collimator system 104, and the beam shaping system 105. The lens system 103 shapes the laser beams of the respective colors output from the light source 101 into substantially parallel light with high directivity. The laser beams of the respective colors shaped by the lens system 103 enter the scanner 106. The scanner 106 is a device to form an image by scanning with the entered laser beams of the respective colors in a two-dimensional direction. The operation of the scanner 106 is controlled by the control unit 107 in response to the image signals of the respective colors. The laser beams of the respective colors output from the scanner 106 are entered into the projection lens 108 as an enlargement system to be enlarged, and then, are entered into the reflection mirror 109, provided facing the screen 120. Then, the laser beams of the respective colors are reflected toward the screen 120 and transmitted through the screen 120 to be visually recognized by an observer.

Since the projector 100 of the first exemplary embodiment performs display using a laser beam, a mechanism (safety mechanism) is required to prevent the laser beam from being output to the observer side by blocking the beam when some abnormal condition occurs. Therefore, the laser beam with high intensity may not be accidentally output to the observer side due to a failure of the light source or a failure of the scanner.

The international safety standards of laser radiation are defined in IEC/TC 76. Currently, standards documents "IEC 60285 series" on laser safety are issued based on various experimental data. These documents include a parent standard "IEC 60825-1" that defines common matters on the laser safety and individual standards covering an optical communication device, a medical device, a high-power laser device, etc., and new standard or reviews are made as needed to reflect the progress of laser applied technology. In IEC (International Electrotechnical Commission) 60825-1, a damage incidence rate due to laser radiation was obtained from accident examples in the past and animal experiments. The laser beam intensity of one-tenth of the exposure amount with which the damage incidence rate becomes 50% was defined as "Maximum Permissible Exposure" (abbreviated to MPE). MPE is determined by two axes of wavelength $\lambda$ and exposure time t. If the radiation level is smaller than MPE, the condition is thought to be safe. However, since the degrees of risk that lasers pose to humans variously differ according to wavelengths, emission durations, and energy amounts thereof, it is impossible to consider lasers as one group to which common safety standards can be applied. Accordingly, in IEC, lasers are grouped into general classes from a class which is essentially safe to a class which is dangerous to both eyes and skin, and the maximum exposure level permitted to each of them is defined as "Accessible Emission Limit" (abbreviated to AEL).

(1) Class 1: a class in which AEL is set so as not to exceed MPE under any condition is referred to as Class 1. This includes one designed so as not to technically exceed MPE. For example, in a Class 1 case, even if a device has a laser source exceeding MPE built-in, it has a structure that the laser beam thereof can not be seen or touched. In another example, in another Class 1 case, a device is designed to have a structure in which the radiation level does not exceed MPE by a mechanism capable of blocking all laser beams that may possibly reach an eye or come into contact with a human body when an external construction for blocking is detached.

(2) Class 1M: a class in which no damage occurs when seen with a naked eye is referred to as Class 1M. The observation condition is that a device is seen with a naked eye at a distance of 10 cm from a light source (from the screen 120 in the laser display in this case).

(3) Class 2: a class covering visible light with wavelength $\lambda$=400 to 700 nm at a power level of 1 mW that avoids the risk by aversive reaction of an eye ($\leq 0.25$ seconds).

(4) Class 2M: a class in which no damage is thought to occur when seen with a naked eye, as with Class 1M. A limited class in which the aversive reaction makes the observation with an eye (at a distance of 10 cm) safe.

(5) Class 3R: a class in which the power limit value is five times the value of Class 1 or Class 2.

(6) Class 3B: a class of a dangerous level when a beam is directly seen or touched, and 0.5 W or less for CW light (continuous light).

(7) Class 4: not only a direct beam but scattered light is dangerous, and more than 0.5 W for CW.

In the projector of the first exemplary embodiment, the class of laser beam used for display is set to Class 1 or Class 1M, and, in the case where a laser beam with energy exceeding the Class 1 or 1M is output due to failure, at least one optical member (at least one optical member of the lens system 103, the scanner 106, the projection lens 108, the reflection mirror 109, and the screen 120 in the first exemplary embodiment) located in the optical path of the laser beam is broken (including deformation) or altered in quality. Further, the laser beam is diffused or absorbed by the breakage, or the like, so that the high intensity laser beam having energy exceeding the accessible emission limit may not be output from the screen 120 to the observer side as it is.

Specifically, the following modes are adopted.

(A) Light Blocking with Screen

FIGS. 2A and 2B are schematic diagrams showing a sectional structure of the screen 120.

As shown in FIG. 2A, the screen 120 includes a diffusion layer 121 with high diffusivity in order to achieve improvements in viewing angle characteristics and reduction of speckles. Since the light source 101 is a laser source with high rectilinear propagation and coherence in the first exemplary embodiment, strong diffusivity is required. A light diffusion mechanism using a microlens array, which is common in a rear projector, is insufficient. Accordingly, the screen includes a considerable thick Mie scattering layer, or the like. As well as with a general rear projector, in order to eliminate the difference in viewing angle characteristics due to location difference of the screen 120, a Fresnel lens 122 may be prepared at the light source side of the screen 120. In the case where the perfect diffusion is nearly achieved by the above high diffusion layer 121, the Fresnel lens 122 is not required. In the first exemplary embodiment, a resin layer (coloring layer) 123, colored by the heat of the laser beam, is provided on the surface or inside of a member (a member including the high diffusion layer, the Fresnel lens, or the like) that forms the screen 120. The coloring layer 123 is adjusted so as to color, by heat, when the power (W) per unit time reaches a predetermined threshold value that has been set based on AEL, that is, when the layer is heated excessively by the laser beam L with energy exceeding AEL. The principle of coloring is the same as that of laser marking, or the like.

More specifically, as shown in FIG. 2B, a material absorbs light energy depending on the absorptive power of laser beam, the absorbed light energy is converted into thermal energy, and the temperature of the part (steeply) rises. Since the rate of temperature rise is proportional to the applied laser beam energy, when the accumulated amount of heat per unit time exceeds the set threshold value, a coloring layer 123A at the point melts, evaporates, colors or turns color. The position of the coloring layer 123 may be on the surface of the member that forms the screen 120 or inside thereof (under an AR coating layer or the like). In the embodiment of FIGS. 2A and 2B, the coloring layer is provided at the Fresnel lens 122 side of the diffusion layer 121. In the above example, a coloring resin has been cited as the coloring layer 123, however, it may be an inorganic coloring material. For example, silver ion used for a photosensitizing agent for photography or the like may be used.

(B) Light Blocking with Reflection Mirror

Figure 3A:
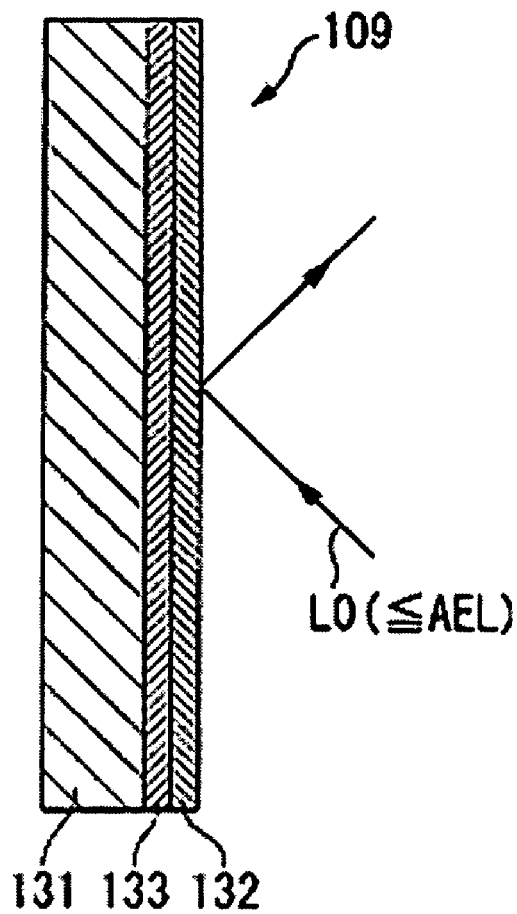
FIGS. 3A and 3B are sectional views showing a configuration of a reflection mirror according to the first exemplary embodiment.
Figure 3B:
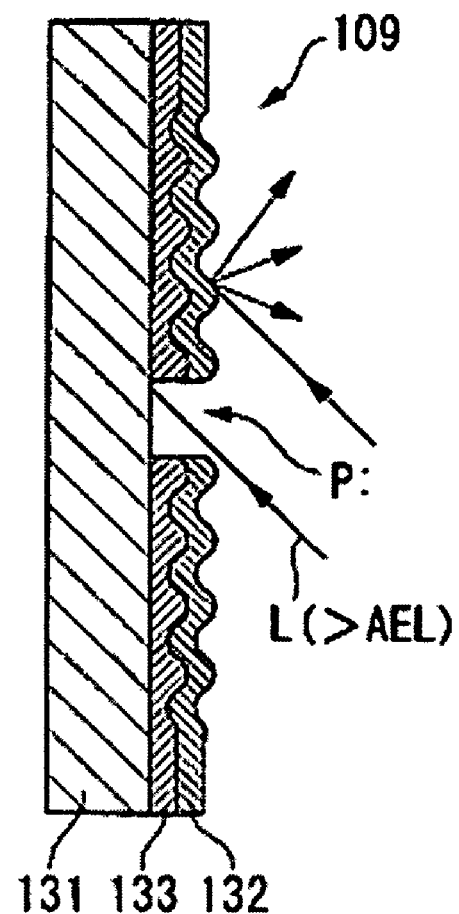

FIGS. 3A and 3B are schematic diagrams showing a sectional structure of the reflection mirror 109.

The reflection mirror 109 is a mirror to secure an optical path in the thin casing 110. As shown in FIG. 3A, a WAX layer 133 as a solid layer is placed on a black (light-absorbing) base material 131 formed by carbon fiber FRP (CFRP) or the like, and a high-reflectance light reflection film 132 of AlNd (Aluminum-Neodymium) or the like is filmed thereon. The WAX layer 133 is adjusted so as to melt by heat when the power per unit time reaches a predetermined threshold value that has been set based on AEL, that is, when the layer is heated excessively by the laser beam L with energy exceeding AEL.

When the WAX layer 133 melts, as shown in FIG. 3B, the light reflection film 132 on the same layer deforms or peels off. A laser beam L with dangerous intensity is prevented from advancing toward the user side because the beam is diffused in the former case and because the beam is absorbed by the light-absorbing base material 131 exposed by the peeling of the light reflection film 132 (peel portion P) in the latter case. The solid layer 133 is not limited to the WAX layer, but any material may be used as long as it is adjusted so as to melt when the layer is excessively heated by the laser beam L, with energy exceeding AEL. Further, the base material 131 is not limited as described above, as long as it has an absorption wavelength region in the wavelength region of the laser beam.

(C) Light Blocking with Projection Lens

In the case where the steering angle of the scanner 106 can not be sufficiently secured, the projection lens 108 is required for expanding the steering angle of the beam so that the laser beam reaches the entire screen. The same light blocking mechanism as that of the screen 120 can be applied to the projection lens 108. That is, by providing a coloring layer on the surface or the inside of the projection lens 108, a beam having energy exceeding AEL is absorbed, and such a beam with high intensity can be prevented from being output to the observer side.

Figure 4A:
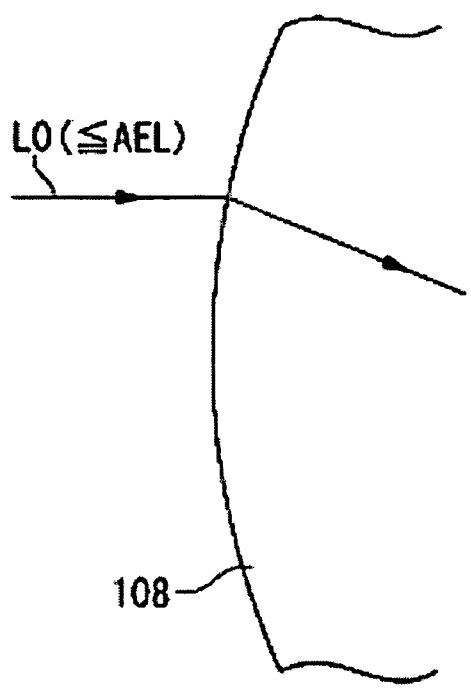
FIGS. 4A and 4B are sectional views showing a configuration of a projection lens according to the first exemplary embodiment.
Figure 4B:
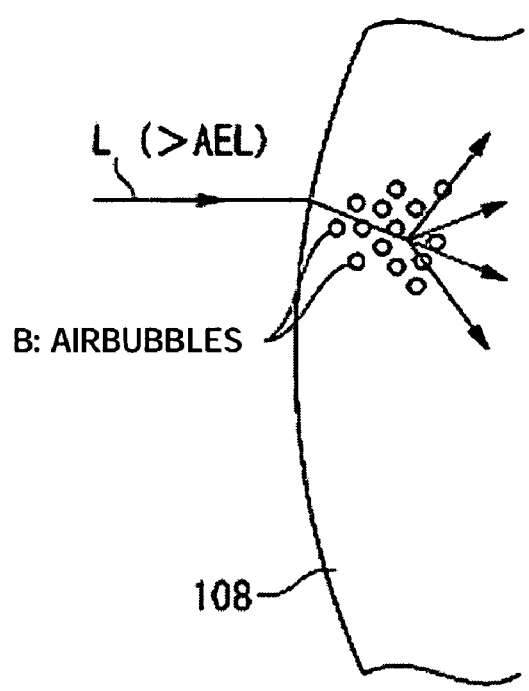

Alternatively, as shown in FIGS. 4A and 4B, the projection lens 108 is formed by a material (e.g., so adjusted acryl) that phase-transitions (fuses, sublimates, or the like) by the heat when the power per unit time reaches a predetermined threshold value that has been set based on AEL, that is, when the material is excessively heated by the laser beam with energy exceeding AEL so as to prevent the rectilinear propagation of the laser beam L or diffuse the beam by the deformation of the lens, production of air-bubbles B within the lens, or the like. The projection lens 108 is not required when the scanning angle can be sufficiently secured at the scanner side.

(D) Light Blocking with Scanner

The scanner 106 is a device for forming an image by scanning the respective laser beams of R, G, and B in the two-dimensional direction and scanning the screen with the laser spots respectively illuminated on the screen. The horizontal scan and the vertical scan may be performed by one device (that is, biaxial scan is performed by one scanner device), or the horizontal scan and the vertical scan may be performed by separate devices. In the first exemplary embodiment, an MEMS scanner made of silicon capable of biaxial scan is used.

Figure 5A:
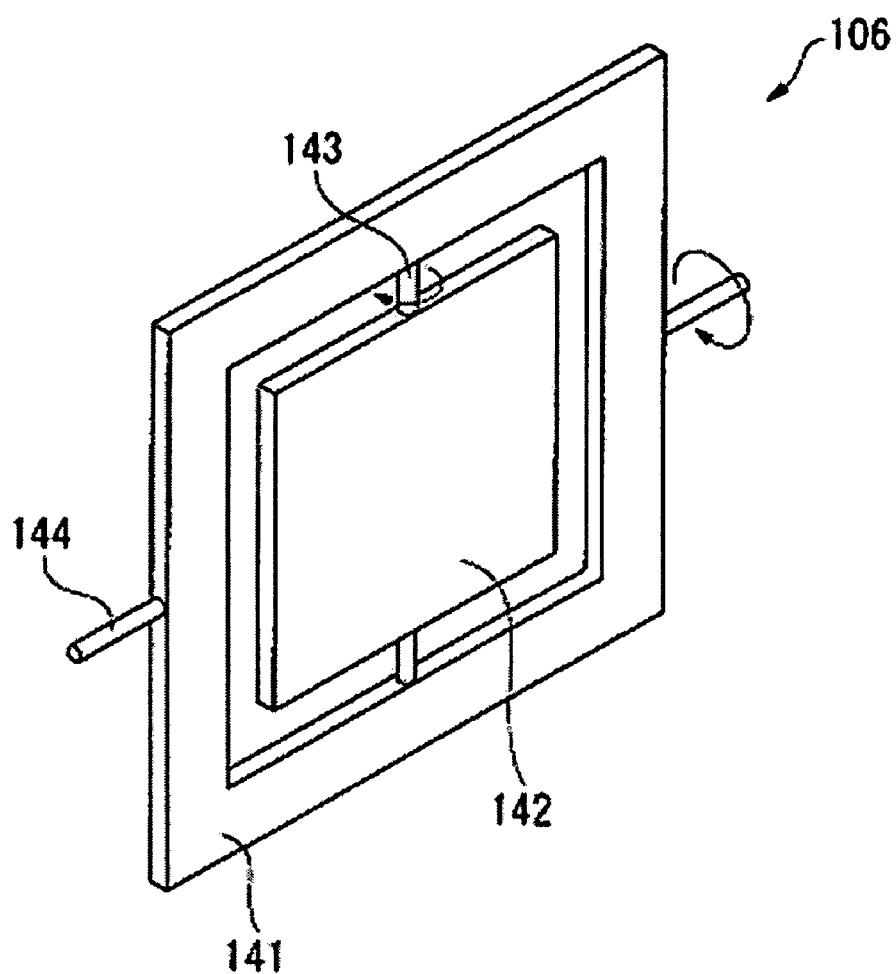
FIGS. 5A and 5B are a perspective view and a sectional view showing a configuration of a scanner according to the first exemplary embodiment.
Figure 5B:
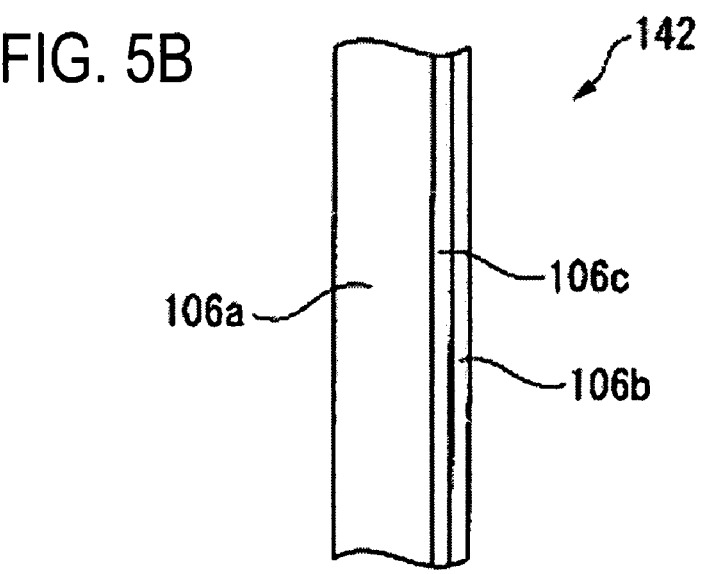

FIGS. 5A and 5B are schematic diagrams showing an example of the scanner 106.

As shown in FIG. 5A, the scanner 106 generally has a frame 141 of a substantially rectangular frame form and a reflection mirror unit 142 provided inside the frame 141. A first rotating shaft 143 that rotates inwardly is provided at the central position of a pair of opposed sides of the frame 141. A second rotating shaft 144 that rotates outwardly is provided at the central position of a pair of opposed sides orthogonal thereto. The inner end of the first rotating shaft 143 is connected to the reflection mirror unit 142 located at an inner side of the frame 141. The reflection mirror unit 142 is arranged so as to rotate in the biaxial direction around these first rotating shaft 143 and the second rotating shaft 144.

As shown in FIG. 5B, the moving reflection mirror unit 142 is formed by laminating a WAX layer 106c as a solid layer and a light reflection film 106b in order on the surface of a movable plate 106a made of silicon. The laser beam L with dangerous intensity is prevented from advancing toward the user side by the deformation or peeling of the mirror when light more than predetermined power is irradiated, that is, when the power per unit time reaches a predetermined threshold value that has been set based on AEL, on the same principle as in the case of the reflection mirror 109. Since silicon has low reflectance of visible light, when the silicon layer as a foundation layer is exposed by the peeling of the mirror, or the like, the exposed part can absorb the light sufficiently. In the case where the horizontal scan and the vertical scan are performed by separate devices, the light blocking function may be provided in one of them, or in both of them.

By the way, the solid layer 106c is not limited to the WAX layer, but any material may be used as long as it is adjusted so as to melt when the material is heated excessively by the laser beam with energy exceeding AEL. Further, the movable plate 106a is not necessarily limited to the one made of silicon, as long as it has an absorption wavelength region in the wavelength region of the laser beam.

(E) Light Blocking with Lens System (Collimator System, Beam Shaping System)

The same light blocking mechanism as that of the projection lens 108 can be applied to the lens system 103. That is, a configuration in which a coloring layer is provided on the surface or the inside of the lens, or the lens is formed by a material that phase-transitions when heated to a certain degree of temperature or more, or the like, may be adopted. The light blocking function may be provided in one of the collimator system 104, the beam shaping system 105, or in both of them.

As types of failures, there are (a) a case where the operation of the scanner 106 is normal and the output intensity of the light source 101 is abnormal and (b) a case where the output intensity of the light source 101 is normal and the operation of the scanner 106 is abnormal (the scanner 106 stops due to failure), and different AELs are set to these (a) and (b), respectively. For example, for a display of 30 inches and 1080 p, the laser power up to 1.12 $mW/mm^2$ for (a) and to 8.35 $mW/mm^2$ for (b) are permitted up. Accordingly, in the first exemplary embodiment, in order to satisfy the safety standards both of (a) and (b), a first AEL (first accessible emission limit) to be set in the case (a) is applied to an optical member located before the scanner in the optical path of the laser beam, and a second AEL (second accessible emission limit) to be set in the case (b) is applied to an optical member located behind the scanner in the optical path of the laser beam. That is, the lens system 103 and the scanner 106 are arranged so as to be broken or altered in quality by the laser output exceeding the first AEL, while the projection lens 108, the reflection mirror 109, and the screen 120 are arranged so as to be broken or altered in quality by the laser output exceeding the second AEL.

As described above, according to the projector 100 of the first exemplary embodiment, since the laser beam is blocked by directly breaking the optical member or the like through no conventional complex control, the safety of display can be ensured independent of errors due to malfunction of the sensor, or the like.

Since the optical member with such a safety mechanism has a special structure for breakage or change in quality, higher cost is required compared to the general one. However, in the case where the structure is applied to the optical member located before the enlargement system 108 like in (D) and (E) described above, because the size of the optical member can be made smaller by adjusting the magnifying power, costs may be reduced or minimized.

Second Exemplary Embodiment

Figure 6A:
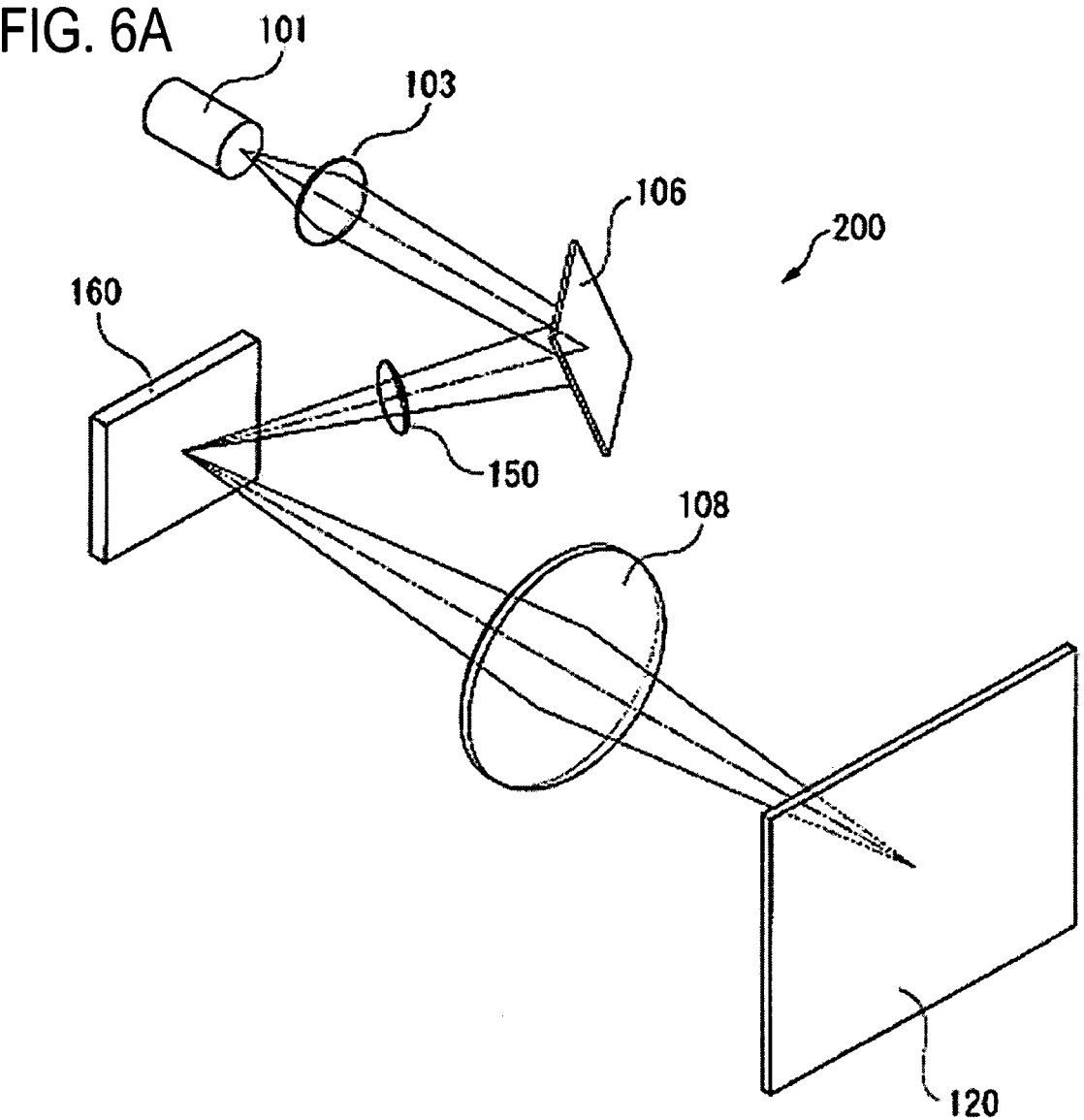
FIGS. 6A and 6B are schematic diagrams showing a configuration of a projector according to a second embodiment of the invention.
Figure 6B:
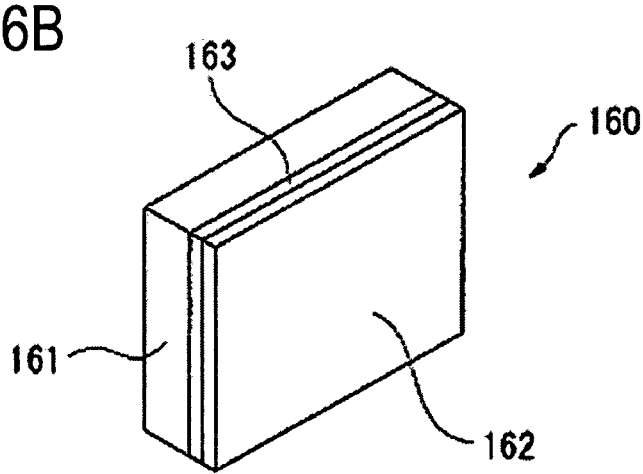

FIGS. 6A and 6B are schematic diagrams showing a configuration of a projector according to a second exemplary embodiment of the invention.

As shown in FIG. 6A, a projector 200 of the second exemplary embodiment generally has a light source 101 to output a laser beam, a lens system 103 including a collimator system and a beam shaping system, a scanner 106 to scan the entered laser beam in a two-dimensional direction, a light collection system 150 to collect the scanned light, a reflection mirror 160 to reflect the collected light, and an enlargement system 108 to enlarge and project the reflected beam toward a screen 120.

In this projector 200, a laser beam output from the light source 101 is shaped into substantially parallel light with high directivity by the lens system 103, and then, used to scan, in a two-dimensional direction, by the scanner 106. The light output from the scanner 106 is once collected by the light collection lens 150 as a light collection system, and entered into the reflection mirror 160 as light with a small beam diameter. Then, the light is reflected toward the projection lens 108 as an enlargement system, enlarged here, and then, enlarged and projected onto the screen 120, transmitted through the screen 120, and visually recognized by an observer.

In the projector 200, the structures of the light source 101, the lens system 103, the scanner 106, the enlargement system 108, and the screen 120 are the same as those in the first exemplary embodiment. The difference is that the light collection system 150 and the reflection mirror 160 are provided between the enlargement system 108 and the scanner 106.

The structure of the reflection mirror 160 is the same as that in the first exemplary embodiment. That is, as shown in FIG. 6A, a WAX layer 163 as a solid layer is placed on a light-absorbing base material 161 and a high-reflectance light reflection film 162 of AlNd, or the like is filmed thereon. The WAX layer 163 is adjusted so as to melt by the heat when the power per unit time reaches a predetermined threshold value that has been set based on AEL, that is, when the layer is heated excessively by the laser beam with energy exceeding AEL. When the WAX layer 163 melts, the light reflection film 162 on the same layer deforms or peels off. A laser beam with dangerous intensity is prevented or discouraged from advancing toward the user side because the light is diffused in the former case and because the light is absorbed by the light-absorbing base material 161 exposed by the peeling of the light reflection film 162 in the latter case. It is noted that the solid layer 163 is not limited to the WAX layer, but any material may be used as long as it is adjusted so as to melt when the material is heated excessively by the laser beam with energy exceeding AEL.

In the projector 200 of the second exemplary embodiment, the laser beam is blocked by physically breaking the reflection mirror 160, or the like. Accordingly, the safety can be ensured more reliably compared to the related art that detects malfunction by a sensor, or the like. Since the reflection mirror 160 with such a safety mechanism has a special structure to be broken or altered in quality, higher cost is required compared to the general one. However, in the second exemplary embodiment, because the size of the reflection mirror 160 can be made smaller by collecting the light by the light collection system 150 and then enlarging the light by the enlargement system 108, such a cost rise can be minimized.

Third Exemplary Embodiment

Figure 7:
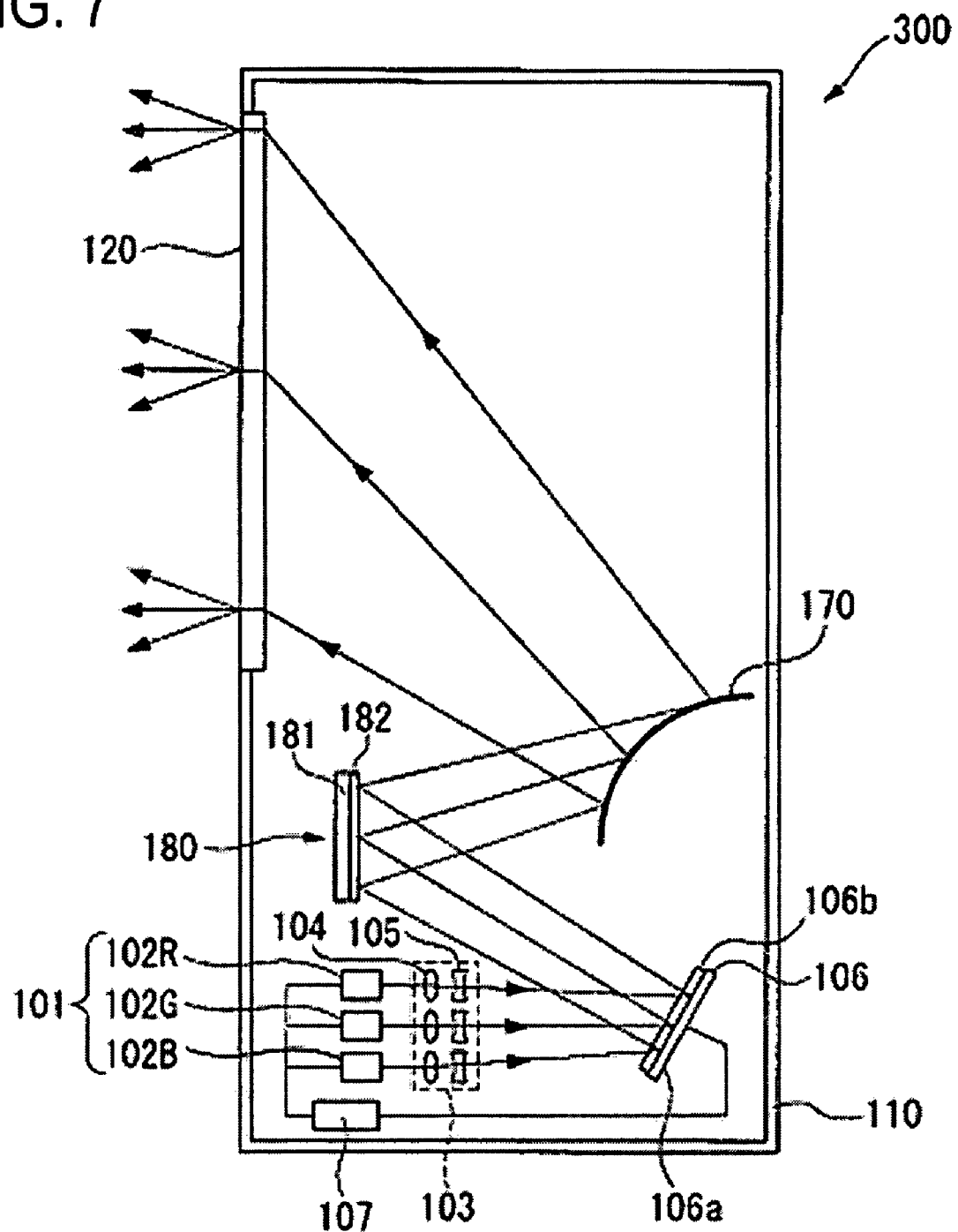
FIG. 7 is a schematic diagram showing a configuration of a projector according to a third embodiment of the invention.

FIG. 7 is a schematic diagram showing a configuration of a projector according to a third exemplary embodiment of the invention.

As shown in FIG. 7, a projector 300 of the third exemplary embodiment generally has a light source 101 to output a laser beam, a lens system 103 including a collimator system and a beam shaping system, a scanner 106 to scan the entered laser beam in a two-dimensional direction, a reflection mirror 160 to reflect the scanned light, and an enlargement system 170 to enlarge and project the reflected beam toward a screen 120.

In this projector 300, a laser beam output from the light source 101 is shaped into substantially parallel light with high directivity by the lens system 103, and used to scan in a two-dimensional direction by the scanner 106. The light output from the scanner 106 is reflected by the reflection mirror 160 toward a curved reflection mirror 170 as the enlargement system, enlarged here, and then, enlarged and projected onto the screen 120, transmitted through the screen 120, and visually recognized by an observer.

In the projector 300, the structures of the light source 101, the lens system 103, the scanner 106, and the screen 120 are the same as those in the first exemplary embodiment. The difference is that the enlargement system 170 has a curved reflection mirror, and a reflection mirror 180 is provided between the enlargement system 170 and the scanner 106.

Figure 8A:
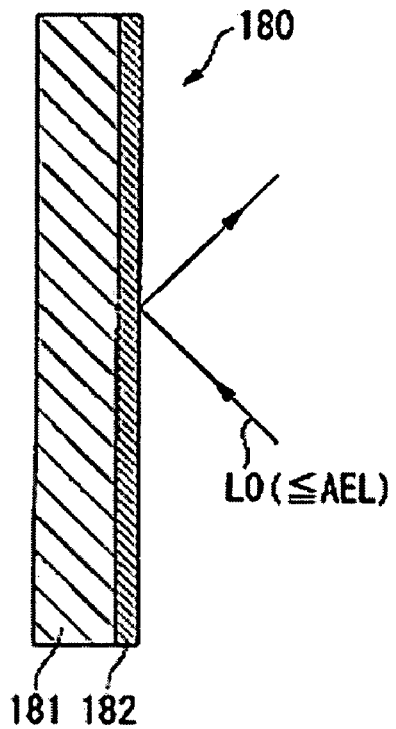
FIGS. 8A and 8B are sectional views showing a configuration of a reflection mirror according to the third exemplary embodiment.
Figure 8B:
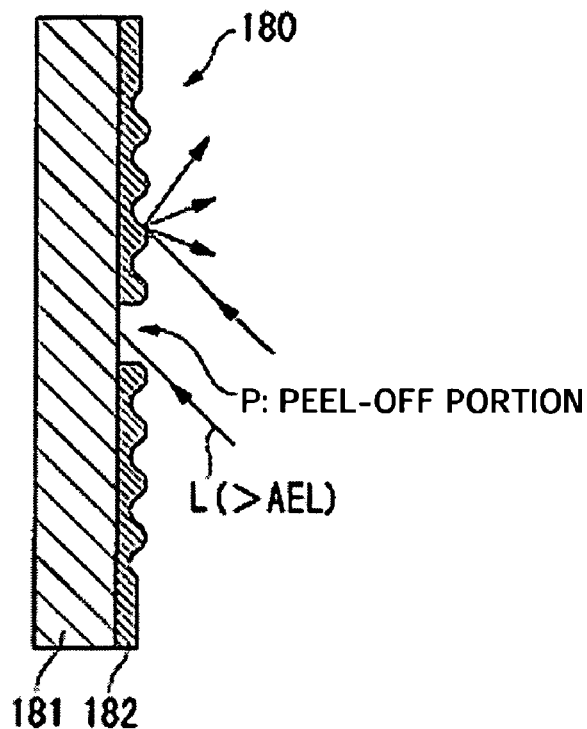

FIGS. 8A and 8B are schematic diagrams showing a sectional structure of the reflection mirror 180.

As shown in FIG. 8A, the reflection mirror 180 has a light reflection film 182 of a low melting point material such as Au, Ag, or Al on a light-absorbing base material 181. The light reflection film 182 is adjusted so as to melt by the heat when the power per unit time reaches a predetermined threshold value that has been set based on AEL, that is, when the film is heated excessively by the laser beam with energy exceeding AEL.

As shown in FIG. 8B, when the light reflection film 182 melts to deform or peel off, a laser beam L with dangerous intensity is prevented or discouraged from advancing toward the user side because the light is diffused in the former case and because the light is absorbed by the light-absorbing base material 181 exposed by the peeling of the light reflection film 182 in the latter case.

Figure 9A:
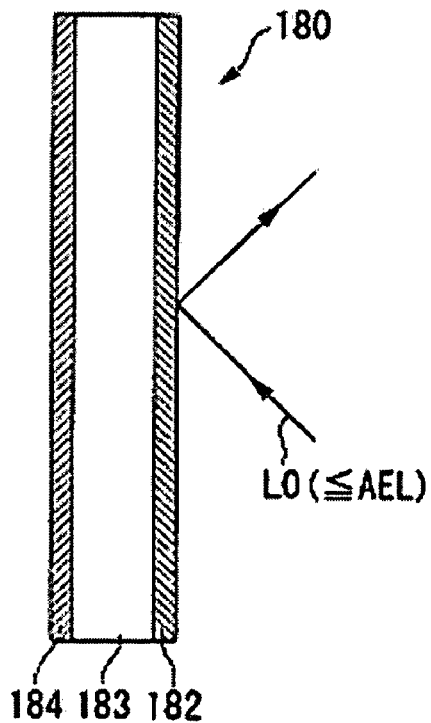
FIGS. 9A and 9B are sectional views showing another configuration of a reflection mirror according to the third exemplary embodiment.
Figure 9B:
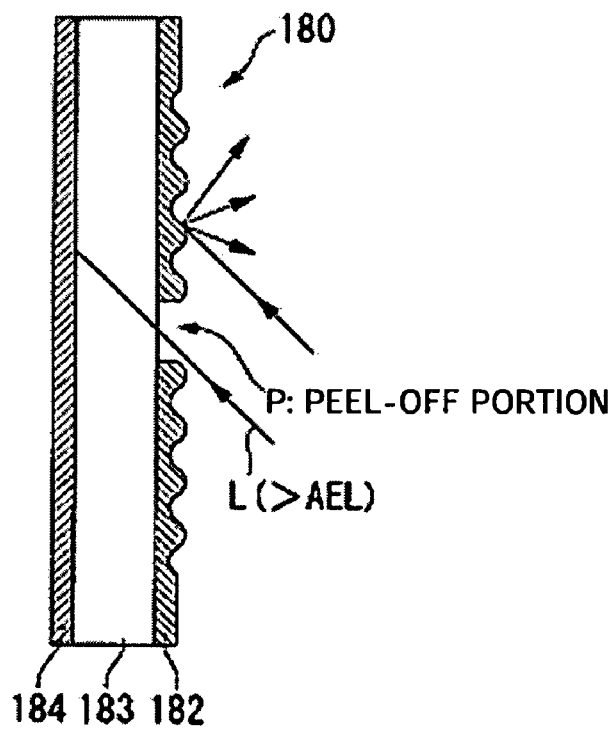

FIGS. 9A and 9B are schematic diagrams showing another form of the reflection mirror 180.

As shown in FIG. 9A, the reflection mirror 180 has a light reflection film 182 of a low melting point material such as Au, Ag, or Al at the light-incident side of a translucent base material, and a light absorption layer 184 at the opposite side to the light-incident side. The form of the light reflection film 182 is the same as that in FIGS. 8A and 8B.

As shown in FIG. 9B, when the light reflection film 182 melts to deform or peel off, a laser beam L with dangerous intensity is prevented or discouraged from advancing toward the user side because the light is diffused in the former case and because the light is transmitted through the translucent base material 183 exposed by the peeling of the light reflection film 182 and absorbed by the light-absorbing layer provided at the rear side thereof in the latter case.

In the projector 300 of the third exemplary embodiment, the laser beam is blocked by physically breaking the reflection mirror 180, or the like. Accordingly, the safety can be more reliably ensured compared to the related art that detects malfunction by a sensor, or the like. Since the reflection mirror 180 with such a safety mechanism has a special structure to be broken or altered in quality, higher cost is required compared to the general one. However, in the third exemplary embodiment, because the size of the reflection mirror 180 is made smaller by adjusting the magnifying power by the enlargement system 170, such a cost rise can be reduced or minimized.

As described above, the exemplary examples have been described by referring to the accompanying drawings, however, the exemplary embodiments are not limited to these examples. Various forms, combinations, etc. of the component members shown in the above-described exemplary embodiments are only examples, and various changes can be made based on design requirements, etc., without departing from the scope and spirit of the invention.

What is claimed is:

1. A projector of rear-projection type, comprising:
a light source that outputs a laser beam, the laser beam having an optical path; and
a scanner that scans a screen with the laser beam,
at least one optical member located in the optical path of the laser beam that is broken or altered in quality when the laser beam has an energy exceeding an accessible emission limit due to failure of the light source or the scanner to prevent the laser beam having the energy exceeding the accessible emission limit from being output from the screen.

2. The projector according to claim 1, the first accessible emission limit being the maximum exposure level permitted when an operation of the scanner is normal and output intensity of the light source is abnormal, and the second accessible emission limit being the maximum exposure level permitted, when the output intensity of the light source is normal and the scanner stops due to failure,
an optical member located before the scanner in the optical path of the laser beam is arranged so as to be broken or altered in quality by a laser output exceeding a first accessible emission limit and an optical member located behind the scanner in the optical path of the laser beam is arranged so as to be broken or altered in quality by a laser output exceeding a second accessible emission limit, the maximum exposure level permitted when an operation of the scanner is normal and output intensity of the light source is abnormal, and the second accessible emission limit being the maximum exposure level permitted, when the output intensity of the light source is normal and the scanner stops due to failure.

3. The projector according to claim 2, the scanner having a movable plate rotatable around a predetermined rotation axis, a solid layer melting by heat of the laser beam exceeding the first accessible emission limit, and a light reflection film being formed on a surface of the movable plate via the solid layer.

4. The projector according to claim 3, the movable plate being formed by a material having an absorption wavelength region in a wavelength region of the laser beam.

5. The projector according to claim 2, the screen having a coloring layer that colors by heat of the laser beam exceeding the second accessible emission limit.

6. The projector according to claim 2, further comprising:
a projection lens provided between the scanner and the screen, the projection lens having a coloring layer that colors by heat of the laser beam exceeding the second accessible emission limit.

7. The projector according to claim 2, further comprising:
a projection lens provided between the scanner and the screen, the projection lens being formed by a material that phase-transitions by heat of the laser beam exceeding the second accessible emission limit.

8. The projector according to claim 2, further comprising:
a collimator or beam shaping lens provided between the scanner and the light source, the collimator or beam shaping lens having a coloring layer that colors by heat of the laser beam exceeding the first accessible emission limit.

9. The projector according to claim 2, further comprising:
a collimator or beam shaping lens provided between the scanner and the light source, the collimator or beam shaping lens being formed by a material that phase-transitions by heat of the laser beam exceeding the first accessible emission limit.

10. The projector according to claim 2, further comprising:
a reflection mirror provided between the scanner and the screen, the reflection mirror having a base material, a solid layer that melts by heat of the laser beam exceeding the second accessible emission limit, and a light reflection film formed on the surface of the base material via the solid layer.

11. The projector according to claim 10, the base material being formed by a material having an absorption wavelength region in a wavelength region of the laser beam.

12. The projector according to claim 1, further comprising:
an enlargement system provided between the screen and the scanner; and
an optical member located before the enlargement system in the optical path of the laser beam arranged so as to be broken or altered in quality when a beam with energy exceeding the accessible emission limit is output.

13. The projector according to claim 12, further comprising:
a light collection system provided between the optical member and the enlargement system.

14. The projector according to claim 1, wherein the at least one optical member is located before the scanner in the optical path of the laser beam.

15. The projector according to claim 1, wherein the at least one optical member is arranged to be broken when the intensity of the laser beam output by the light source reaches a threshold level defined as the accessible emission limit.

16. The projector according to claim 1, wherein the at least one optical member is arranged to be altered when the intensity of the laser beam output by the light source reaches a threshold level defined as the accessible emission limit.

17. The projector according to claim 1, wherein the at least one optical member is located before the output of the projector.

18. The projector according to claim 1, wherein the at least one optical member is broken or altered before the laser beam exits the projector when the laser beam has an energy exceeding an accessible emission limit.

* * * * *